United States Patent [19]

Ishihara

[11] Patent Number: 4,611,129
[45] Date of Patent: Sep. 9, 1986

[54] SIGNAL CONVERSION CIRCUIT
[75] Inventor: Tsutomu Ishihara, Tokyo, Japan
[73] Assignee: NEC Corporation, Tokyo, Japan
[21] Appl. No.: 603,113
[22] Filed: Apr. 23, 1984
[30] Foreign Application Priority Data Apr. 22, 1983 [JP]  Japan ................................. 58-71067
Apr. 22, 1983 [JP]  Japan ................................. 58-71068

[51] Int. Cl.$^4$ .......................... H04R 3/00; H01C 7/06
[52] U.S. Cl. .................................. 307/308; 307/491; 307/310
[58] Field of Search ................ 307/308, 309, 310, 491

[56] References Cited

U.S. PATENT DOCUMENTS

| 3,705,316 | 12/1972 | Burrous et al. | 307/310 |
| 3,836,796 | 9/1974 | Solomon et al. | 307/308 |
| 3,893,035 | 7/1975 | Higgens | 307/308 |
| 4,435,653 | 3/1984 | Matui et al. | 307/491 |
| 4,463,274 | 7/1984 | Swartz | 307/491 |

OTHER PUBLICATIONS

"Characteristics and Application of a Semiconductor Pressure Sensor", Published in the Japanese Technical Magazine, *Sensor Technique*, vol. 2, No. 8, (Jul. 1982), pp. 97-103.

*Primary Examiner*—John S. Heyman
*Attorney, Agent, or Firm*—Laff, Whitesel, Conte & Saret

[57] ABSTRACT

An electronic circuit uses a two input operational amplifier for converting a pressure into an electrical signal. The bias potentials at the two inputs are equal to each other in the absence of pressure. The bias potential is applied to one input via a pressure sensitive resistor comprising a semiconductor diaphram with a resistance diffused thereon. When pressure appears, the resistance changes and there is a difference of potential at the two inputs, which is processed into the electrical signal.

14 Claims, 6 Drawing Figures

SIGNAL CONVERSION CIRCUIT

This invention relates to a signal conversion circuit and, more particularly, to a resistance-voltage circuit for converting a variation of resistance, detected by a physical value detector element, into an electrical voltage signal.

Heretofore, a pressure converter using a strain gauge has been well known and used as a resistance-voltage conversion circuit. In the pressure converter, as disclosed in an article entitled "CHARACTERISTICS AND APPLICATION OF A SEMICONDUCTOR PRESSURE SENSOR", published in the Japanese technical magazine "SENSOR TECHNIQUE", Vol. 2, No. 8 (July, 1982), pp. 97-103, a Wheatstone bridge circuit is constructed of gauge resistors. A resistance variation of the gauge resistors is caused in response to an applied pressure. Then, by supplying a constant voltage or current to the bridge circuit, an unbalanced voltage is amplified to provide an output signal which is proportional to the applied pressure.

Such a conventional pressure converter, however, has the following disadvantages:

(1) A number of guage resistors are necessary for constructing a Wheatstone bridge;
(2) High quality differential amplifier circuits are necessary for amplifying a minute unbalanced voltage from the bridge circuit, thereby making the converter complicated and expensive; and
(3) Because a number of resistors are necessary to be connected to operational amplifiers, there are problems in quality and matching, with a result which makes it impossible to make a monolithic integrated circuit.

It is, therefore, an object of this invention to provide a signal conversion circuit for resistance-voltage converting without requiring a number of gauge resistors.

It is another object of this invention to provide a simplified signal conversion circuit which is adapted to be made in an integrated circuit.

According to this invention, a signal conversion circuit converts a resistance into an electric signal. The circuit comprises an operational amplifier having inverted and non-inverted input terminals, and an output terminal. A voltage source and feedback resistor means are connected between the inverted input terminal and the output terminal. Sensing means are connected between the voltage source and the non-inverted input terminal. A resistance of the sensing means is responsive to a condition of an object to be detected.

The features and advantages of this invention will be better understood from the following detailed description of preferred embodiments of this invention taken in conjunction with the accompanying drawings, wherein.

Figure 1A:
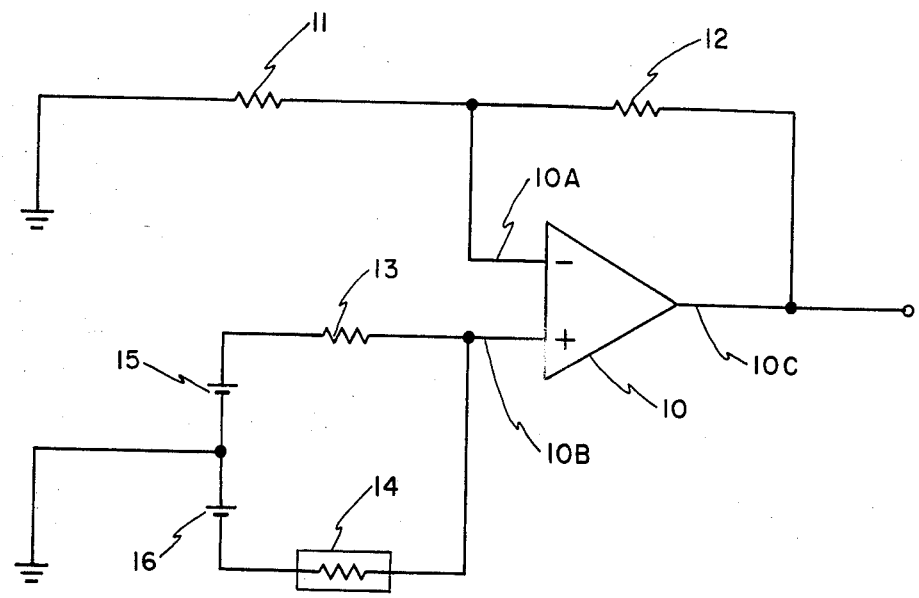
FIGS. 1A and 1B are circuit diagrams of a first embodiment of this invention and a modification thereof, respectively.

Referring to FIG. 1A, a first embodiment of this invention comprises an operational amplifier 10 having inverted and non-inverted input terminals 10A and 10B, and an output terminal 10C. A resistor 11 is connected between the inverted input terminal 10A and a biasing means (ground in this embodiment). A resistor 12 is connected between the inverted input terminal 10A and the output terminal 10C. A resistor 13 is connected between the non-inverted input terminal 10B and a positive voltage source 15. A gauge resistor 14 is connected between the non-inverted input terminal 10B and a negative voltage source 16. The gauge resistor 14 has a resistance which is varied in response to a pressure applied thereto. The gauge resistor 14 may be a diffusion resistor formed on a semiconductor diaphragm by means of a selective diffusion technique. The resistors 11 and 12 provide a negative feedback loop for feeding a part of the output voltage from the output terminal 10C to the inverted input terminal 10A.

Assuming that the gauge resistor 14 has a resistance $R_p$ when pressure is not applied thereto and a resistance $R_p + \Delta R_p$ when pressure is applied. The resistances of the resistors 11, 12 and 13 are represented by $R_1$, $R_2$ and $R_0$, respectively, and voltages of the voltage sources 15 and 16 are represented by $V_1$ and $V_2$, respectively. A voltage $V_N$ appears at the non-inverted input terminal 10B and can be represented by $$V_N = \frac{(R_P + \Delta R_P)V_1 + R_0 V_2}{(R_P \pm \Delta R_P) + R_0} \quad (1)$$

On the other hand, because a nominal short circuit biases the inverted and the non-inverted input terminals 10A, 10B to the same potential, the following equation (2) can be obtained by applying Kirchoff's law to the inverted input terminal 10A:

$$\frac{V_N}{R_1} + \frac{V_0 - V_N}{R_2} = 0 \quad (2)$$

where $V_0$ stands for an output voltage from the output terminal 10C. Therefore, the output voltage $V_0$ can be obtained from the equations (1) and (2) as follows:

$$V_O = \left(1 + \frac{R_2}{R_1}\right) \frac{(R_P + \Delta R_P)V_1 + R_0 V_2}{(R_p + \Delta R_p) + R_O} \quad (3)$$

For simplicity of the description, assuming that $V_1 = V_E$, $V_2 = V_E$ and $R_p = R_0$, $$V_O = \quad (4)$$

$$\left(1 + \frac{R_2}{R_1}\right) \frac{R_P/R_P}{2 + R_P/R_P} V_E \approx \frac{1}{2}\left(1 + \frac{R_2}{R_1}\right) \frac{\Delta R_P}{R_P} V_E$$

where $\Delta R_p/R_p \ll 1$. This means that the output voltage $V_0$ is proportional to the resistance variation $(R_p/R_p)$ which is caused in response to the pressure applied to the gauge resistor 14. Further, the amplification degree (pressure sensitivity) can be adjusted by selecting the resistance ratio $(R_2/R_1)$ of the feedback resistors 12 and 11.

As described above, in this embodiment, the resistance variation $(\Delta R_p/R_p)$ itself is treated as a signal to be processed. The converter circuit becomes very simple. Further, it is possible to make a monolithic integrated circuit by using a diffusion gauge resistor formed on a semiconductor diaphragm, diffusion resistors formed on non-pressure-sensitive areas of the same substrate, and pheripheral circuit elements.

Although the resistance Rp of the diffusion gauge resistor 14 formed on the semiconductor diaphragm under the non-applied pressure has a positive temperature coefficient, this can be compensated by using, as the resistor 13, a diffusion resistor formed on the non-pressure-sensitive area of the same substrate.

Figure 1B:
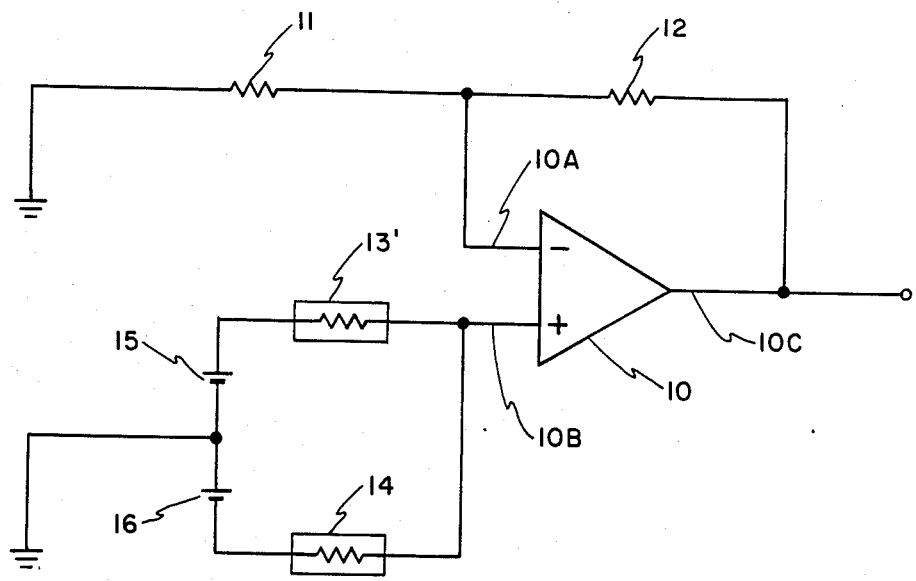

Referring now to FIG. 1B, a modification of the first embodiment is identical to the first embodiment except that, instead of the resistor 13, there is a guage resistor 13' having a resistance characteristic which is reverse to the resistance characteristics of the gauge resistor 14. The gauge resistor 13' has a resistance $R_N$ when the pressure is not applied, and $R_N - \Delta R_N$ when applied. In this modification, the equations (1), (3) and (4) are respectively modified, as follows:

$$V_n = \frac{(R_P + \Delta R_P)V_1 + (R_N - \Delta R_N)V_2}{R_P + R_N + \Delta R_P + \Delta R_N} \quad (1')$$

$$V_O = \left(1 + \frac{R_2}{R_1}\right) \frac{(R_P + \Delta R_P)V_1 + (R_N - \Delta R_N)V_2}{R_P + R_N + \Delta R_P - \Delta R_N} \quad (3')$$

$$V_O = \left(1 + \frac{R_2}{R_1}\right) \frac{\Delta R}{R} V_E \quad (4')$$

In the first embodiment (FIG. 1A) or its modification (FIG. 1B), when the resistances $R_0$ and $R_p$, or $R_N$ and $R_p$ are not exactly equal to each other, an output offset voltage occurs. This offset voltage can be removed in a second embodiment and its modification, shown in FIGS. 2A and 2B, respectively.

Figure 2A:
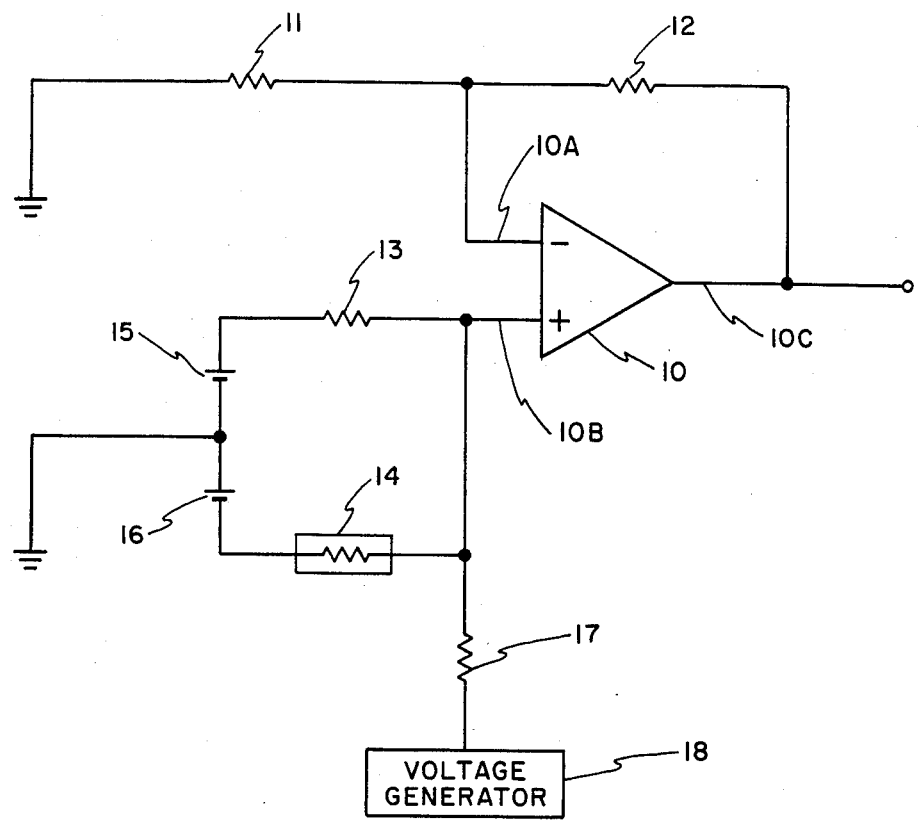
FIGS. 2A and 2B are circuit diagrams of a second embodiment of this invention and a modification thereof, respectively.
Figure 2B:
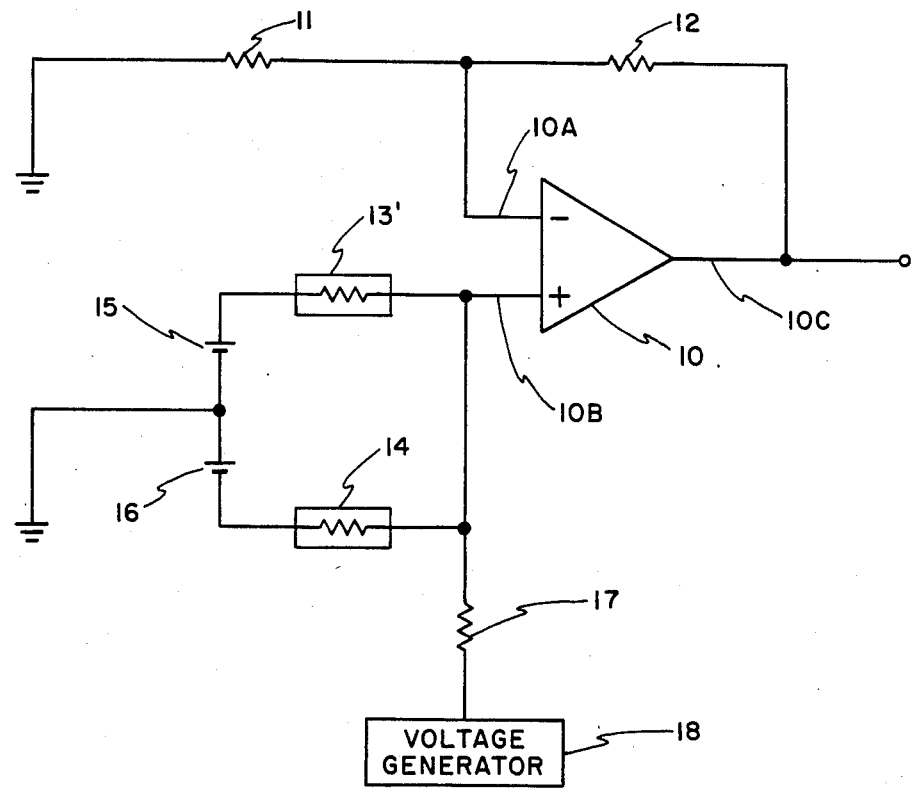

Referring to FIGS. 2A and 2B, each of the second embodiment and its modification further comprises a resistor 17 connected to the non-inverted input terminal 10B and having resistance $R_3$. A voltage generating means 18 is connected to the resistor 17, for providing a voltage $V_3$.

The zero output voltage $V_O$ can be obtained under the condition that pressure is not applied to the gauge resistor and that current passing through the resistor 11 is zero. That is, the potential of the inverted input terminal 10A is the same as the potential of the biasing means (0 Voltage in the embodiment). At this time, the following equation (5) is satisfied in the embodiment:

$$\frac{V_E}{R_0} - \frac{V_E}{R_P} + \frac{V_3}{R_3} = 0 \quad (5)$$

Assuming that $\epsilon = (Rp - R_0)/Rp = (Rp - R_N)/Rp$, the condition for satisfying the offset voltage of zero is as follows:

$$\frac{V_3}{R_3} = -\frac{\epsilon}{R_P(1-\epsilon)} V_E \approx -\epsilon \frac{V_E}{R_P} . \quad (6)$$

This means that it is possible to make the offset voltage zero by adjusting the resistance $R_3$ of the resistor 17 and/or the voltage $V_3$ of the voltage generating means 18.

Figure 3A:
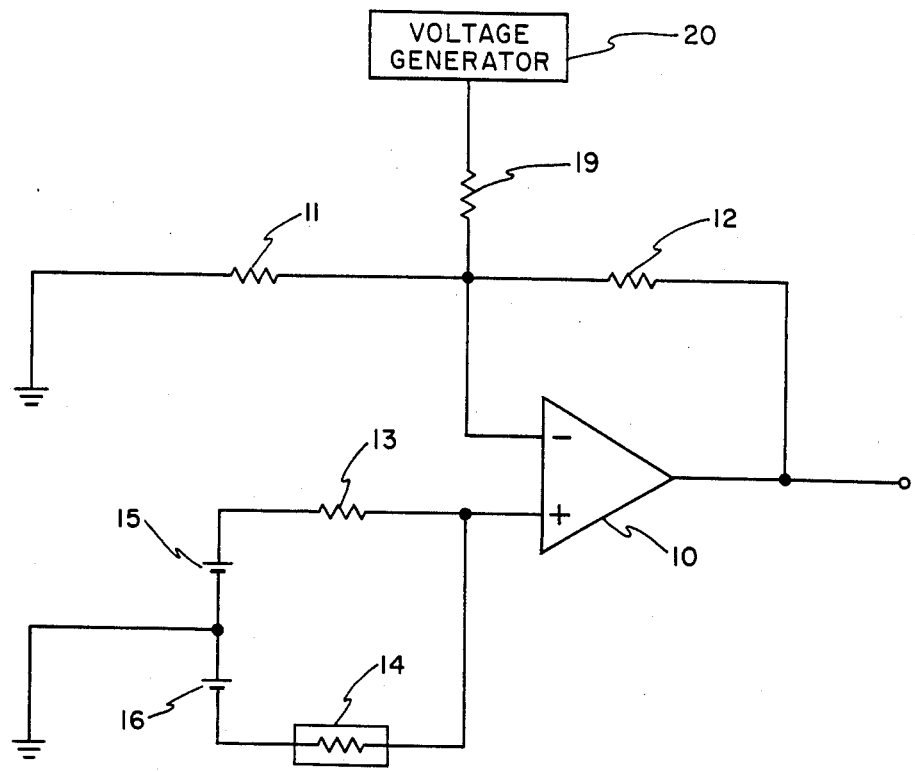
FIGS. 3A and 3B are circuit diagrams of a third embodiment of this invention and a modification thereof, respectively.
Figure 3B:
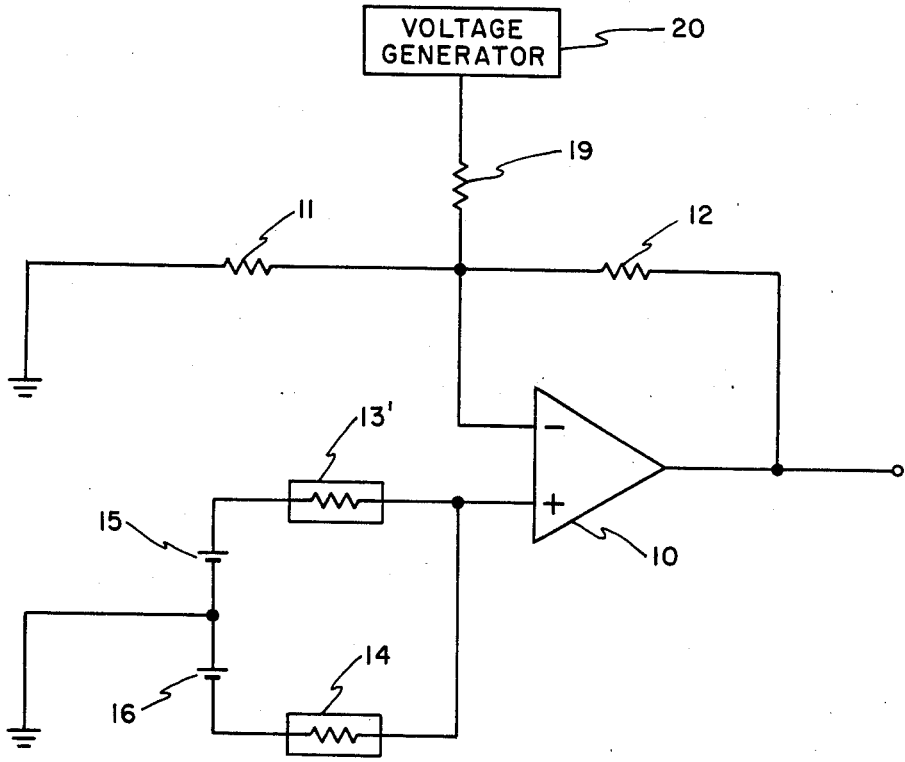

Referring to FIGS. 3A and 3B, a third embodiment of this invention and its modification are identical to the first embodiment and its modification, respectively, except for the addition of a resistor 19 connected to the inverted input terminal 10B and having resistance $R_4$. A voltage generating means 20 is connected to the resistor 19 for providing a voltage $V_4$.

Under the condition that pressure is not applied to the gauge resistor, the output voltage $V_0$ is represented by the following equation (7):

$$V_O = \frac{R_2}{\frac{1}{R_O} + \frac{1}{R_P}} \cdot \left(\frac{1}{R_1} + \frac{1}{R_2} + \frac{1}{R_4}\right) \cdot \left(\frac{1}{R_O} - \frac{1}{R_P}\right) \cdot V_E - \frac{R_2}{R_4} V_4 \quad (7)$$

Assuming that $\epsilon = (Rp - R_0)/Rp = (Rp - R_N)Rp$ and $R_4 >> R_1, R_2$, the equation (7) can be rewritten as follows:

$$V_O = \left(1 + \frac{R_2}{R_1}\right) \frac{\epsilon}{2 - \epsilon} V_E - \frac{R_2}{R_4} V_4 \quad (8)$$

$$\frac{\epsilon}{2}\left(1 + \frac{R_2}{R_1}\right) V_E - \frac{R_2}{R_4} V_4 [\epsilon << 2]$$

This means that it is possible to make the offset voltage zero, even when there is an unbalanced factor. The zero setting is made by adjusting the resistance $R_4$ of the resistor 19 and/or the voltage $V_4$ of the voltage generating means 20.

The unbalanced factor $\epsilon$ varies with a temperature because there is a different in the resistance-temperature-coefficients of the resistors, with a resulting zero-temperature variation. This can be compensated by providing proper temperature coefficients with the resistors 19 (17) and/or the voltage generating means 20 (18).

The resistance variation ratio ($\Delta Rp/Rp$, $\Delta R_N/R_N$) generally has a negative temperature coefficient factor, thereby causing the temperature variation in converter sensitivity, which can be compensated by means of a known method, that is, by providing a positive temperature coefficient with the voltage source or the ratio $R_2/R_1$.

Those who are skilled in the art will readily perceive how to modify the invention. Therefore, the appended claims are to be construed to cover all equivalent structures which fall within the true scope and spirit of the invention.

What is claimed is:

1. A signal conversion circuit for converting a resistance into an electric signal, the circuit comprising:
    an operational amplifier having inverted and non-inverted input terminals, and an output terminal;
    a first voltage source;
    feedback resistor means connected between said inverted input terminal and said output terminal; and
    sensing means connected between said first voltage source and said non-inverted input terminal, said sensing means including two sensing elements connected in parallel with each other and having resistance characteristics which are reverse to each other, said resistances being responsive to a condition of an object which is to be detected.

2. The signal conversion circuit as claimed in claim 1 further comprising a resistor connected between said first voltage source and said non-inverted input terminal.

3. The signal conversion circuit as claimed in claim 1 further comprising a second voltage source connected through a resistor to said operational amplifier.

4. The signal conversion circuit as claimed in claim 3, wherein said second voltage source is connected to said inverted input terminal.

5. A pressure sensitive circuit for generating a signal which is proportional to an applied pressure, said circuit comprising a two input operational amplifier having an output terminal with a pressure sensitive resistor connected to one input terminal and a feedback resistor connected between the other input terminal and the output terminal, said pressure sensitive resistor being a diffusion resistor which is diffused on a semiconductor diaphragm, another resistor diffused at a non-pressure sensitive area of said semiconductor, said pressure sensitive and other resistors being connected in parallel with each other, said parallel resistors having complementary temperature coefficients, a first resistor coupled between a first potential and an input of said operational amplifier, and a second resistor coupled between a second potential and the other input of said operational amplifier, the resistances including means for biasing the two input terminals to substantially the same potential in the absence of pressure on said pressure sensitive resistor, whereby an application of pressure causes a voltage difference at said two input terminals.

6. An electronic pressure detector circuit comprising a two input operational amplifier means, two resistors including means for applying substantially the same potential to said two inputs in the absence of said pressure which is to be detected, means for applying said potential to a point between one of said terminals and one of said two resistors via a pressure sensitive resistor means, said pressure sensitive means being a semiconductor diaphragm having a resistor with one resistance characteristic diffused thereon, whereby a pressure upon said pressure sensitive resistor produces a potential differential between said two terminals, a resistor having a complementary resistance characteristic diffused on a non-pressure sensitive region of said substrate, and means including said amplifier for providing an output signal responsive to said potential difference.

7. The circuit of claim 6 and a voltage generator means coupled to said one input terminal for insuring said same potential in said absence of pressure condition.

8. The circuit of claim 6 and a voltage generator means coupled to the other of said input terminals for insuring said same potential in said absence of pressure condition.

9. A signal conversion circuit for converting a resistance value into an electric signal, said circuit comprising:
an operational amplifier having inverted and non-inverted input terminals, and an output terminal;
first positive and negative voltage sources;
a first resistor connected between said inverted input terminal and said output terminal;
a second resistor connected between said inverted input terminal and a biasing means;
a sensing element connected between said non-inverted input terminal and one of said first positive and negative voltage sources, said sensing element having a resistance which is responsive to a condition of an object which has a condition that is to be detected; and
a third resistor connected between said non-inverted input terminal and the other of said first positive and negative voltage sources.

10. The signal conversion circuit as claimed in claim 9 further comprising a second voltage source connected through a fourth resistor to said inverted input terminal.

11. The signal conversion circuit as claimed in claim 9 further comprising a second voltage source connected through a fourth resistor to said non-inverted input terminal.

12. A signal conversion circuit for converting a resistance value into an electric signal, said circuit comprising:
an operational amplifier having inverted and non-inverted input terminals, and an output terminal;
first positive and negative voltage sources;
a first resistor connected between said inverted input terminal and said output terminal;
a second resistor connected between said inverted input terminal and a biasing means;
a first sensing element connected between said non-inverted input terminal and one of said first positive and negative voltage sources, said sensing element having a resistance which is responsive to a condition of an object which condition is to be detected; and
a second sensing element connected between said non-inverted input terminal and the other of said first positive and negative voltage sources, said first and second sensing elements being connected parallel to each other and having characteristics reverse to each other.

13. The signal conversion circuit as claimed in claim 12 further comprising a second voltage source connected through a fourth resistor to said inverted input terminal.

14. The signal conversion circuit as claimed in claim 12 further comprising a second voltage source connected through a fourth resistor to said non-inverted input terminal.

* * * * *